Patented Oct. 5, 1943

2,330,904

UNITED STATES PATENT OFFICE 2,330,904

FLUX COMPOSITION

Mike A. Miller, New Kensington, Pa., assignor to Aluminum Company of America, Pittsburgh, Pa., a corporation of Pennsylvania No Drawing. Application June 12, 1942, Serial No. 446,733

7 Claims. (Cl. 148—25).

This invention relates to the art of coating and joining metals with low melting point filler metals by the process known as dip-tinning or dip-soldering, and it is more particularly concerned with the provision of a flux for use in such operations.

The process of dip-tinning, or dip-soldering, comprises dipping the material to be tinned or soldered into a molten tin or solder bath and thereafter removing said material. The dip-soldering operation is usually considered to be one wherein a group of articles, held in position for joining, or the portion of such assembly to be joined, is dipped into the molten solder bath. When the material is withdrawn from the bath, the interstices between the members are filled with molten solder metal which solidifies to form a firm metallic bond between the adjoining surfaces. Dip-tinning, on the other hand, is usually considered to be a coating rather than a joining operation, for here a single article rather than an assembly of articles is usually dipped into the molten solder bath. If several articles are dipped at the same time, they are spaced far enough apart to prevent their being joined by the solder withdrawn from the bath. Accordingly, the only solder here pulled out of the bath is that which adheres to the surface of the article, and this coating of solder serves as a source of solder in a later joining operation. In essence both dip-soldering and dip-tinning are alike for both depend on the adherence of a soft solder or low melting point metal to a piece of solid metal. Hereafter the general operation of dipping metal articles into a molten solder bath and withdrawing them therefrom will be referred to as dip-soldering, this term being used to include the usual dip-tinning operation as well. Furthermore, the term, solder, will include both suitable low melting point metals and low melting point alloys employed for soldering.

Dip-soldering is like other metal coating operations in that the surfaces must first be well cleaned so as to permit a metal-to-metal contact between them and the solder. Material difficult to remove is the oxide coating which forms to some degree on nearly all metallic surfaces, and particularly on aluminum surfaces. Dirt and grease are also present on metallic surfaces in some measure, but such impurities are easily removed. Various methods, both mechanical and chemical, have been employed to clean metal surfaces preparatory to dip-soldering, but it has been found most economical and efficient to employ a flux to accomplish this result. This is especially true when dealing with aluminum members.

In dip-soldering the flux is preferably used in the form of a supernatant liquid layer on the molten solder bath; in this manner the members dipped into the bath can be cleaned in the flux and thereafter immersed in the solder, all in a single operation. However, to permit of successful employment in this fashion, the flux must possess certain properties. The most important of these is that the flux be so composed as not to react with the molten solder. Furthermore, the flux should not volatilize to any appreciable extent when in the molten state in contact with the solder, nor where organic substances are employed should they have any tendency to carbonize or to polymerize when kept in the molten state for any considerable length of time or when frequently subjected to a succession of melting and cooling treatments. If such carbonization or polymerization occurs to any appreciable extent, the flux becomes less efficient and grows so xiscous as to greatly inhibit the dipping operation and soon must be discarded altogether. Another reason for employing a flux in the form of a supernatant layer on the solder bath relates to the fact that many solders when in the molten state form a dross upon exposure to the atmosphere. This is undesirable since any dross so formed drags out with the solder when the dipped article is withdrawn from the bath, thereby roughening the surface of the article. The supernatant layer of molten flux prevents the solder from coming into contact with the air and thereby prevents any dross formation.

A type of solder which finds wide application in the dip-soldering of a great variety of metals including aluminum, copper, brass, bronze, nickel, iron and steel is one having a relatively high content of tin. Such solders are usually referred to as "high tin" solders, and that term, as used herein, embraces those solders containing at least 50 per cent by weight of tin. In view of the great variety of metals which may be dip-soldered in a high tin solder bath, it would be desirable if a suitable flux were available for use therewith which would be capable of cleaning the surfaces of those metals, including aluminum, with which the solder may be employed. If such a flux were available, the one bath could be employed interchangeably with all of these metals.

It is therefore an object of this invention to provide a flux which may be employed in dip-soldering operations. Another object is to provide a dip-soldering flux which will clean the surfaces of a variety of metals including aluminum, copper, brass, bronze, nickel, iron and steel. A further object is to provide a flux which may be employed in the form of a supernatant liquid layer on a molten solder bath without reacting with said solder, and which will neither volatilize nor polymerize or carbonize to any appreciable extent when so employed. A more particular object is to provide a flux which may be successfully employed in this fashion in a high tin solder bath.

I have discovered that a flux consisting in large part of both hydrochloric and hydrofluoric addition compounds of certain amino compounds together with a suitable polyhydric alcohol provides an excellent dip-soldering flux that is especially adapted for use as a supernatant layer on a molten solder bath. It is essential to employ amino addition compounds of both hydrochloric and hydrofluoric acids since the flux obtained when addition compounds of only one of those acids are used may not be employed for dip-soldering. In particular, this flux will rapidly remove the oxide coating and other impurities from such metals as aluminum, copper, brass, bronze, nickel, iron and steel, and accordingly, the resulting flux-solder bath may be employed interchangeably with any one of these metals, or any group of them. My flux may be said to be characterized by a substantial absence of interaction with the molten solder at operating temperatures, and by a comparative freedom from vaporization, carbonization, and polymerization at such temperatures. These characteristics serve to give the flux long life, whereas many other fluxes of an essentially organic nature heretofore employed in dip-soldering deteriorate so rapidly that they must often be discarded after a short period of use.

The flux should contain at least one hydrochloric addition compound of the group consisting of the amino alcohols and poly-amines, and at least one hydrofluoric acid addition compound of this same group. By the term "amino alcohols," I refer to the amines that contain at least one hydroxyl group attached to a carbon atom. There may also be more than one amine group in the molecule, but so long as the hydroxyl group is present, the compound is regarded as being an amino alcohol. The amine group may or may not be connected with the carbon atom to which the hydroxyl group is attached. By the term, poly-amines, I refer to the amines that contain two or more amine groups. The amine groups may or may not be connected with the same carbon atom. For the purpose of my invention the amino alcohols and poly-amines are considered to constitute a single group of substances, herein referred to as amino compounds, since they possess a community of physical and chemical properties and behave in the same manner in my fluxes. The hydrochloric and hydrofluoric addition compounds of these substances are likewise closely related. The choice of the particular amino alcohol or poly-amine to be employed in the flux is determined by the temperature at which the molten solder bath is to be maintained. This of course varies for different solders. The amino compound chosen, however, should be one whose addition compound with hydrochloric acid, and with hydrofluoric acid, will be molten yet not volatile at the temperature at which the bath is to be maintained. Amino compounds which I have found especially suitable are monoethanolamine, diethanolamine, triethanolamine, ethylene diamine, diethylene triamine, triethylene tetramine, and tetraethylene pentamine, for example. Although a single amino compound may be employed to form both the hydrochloric and hydrofluoric addition compounds, equally good results may be obtained if two amino alcohols or polyamines, or if mixtures of these compounds, are employed.

The flux should contain a total of at least 25 per cent by weight of the amino hydrochloric and amino hydrofluoric addition compounds, and may contain a total as high as 75 per cent by weight thereof. Neither the hydrochloric nor the hydrofluoric addition compounds should be present in amounts less than 5 per cent by weight of the flux, and I prefer to employ about 15 to 35 per cent by weight of each of these components. When these amino addition compounds are present in less than these minimal amounts, the activity of the flux is not great enough for effective cleaning of the metal surfaces, while if their total exceeds 75 per cent, the flux begins to carbonize and polymerize at an accelerated rate, thereby decreasing the effective life of the flux.

The third component of the flux, the polyhydric alcohol, should comprise from about 25 to 75 per cent by weight of the flux. Representative polyhydric alcohols are ethylene glycol, propylene glycol, and glycerol, although any similar alcohol may be employed whose boiling point is such that it will not vaporize at the temperature of the molten solder bath. The polyhydric alcohol is regarded as forming the vehicle of the flux and is readily adapted for use in a dip-soldering bath inasmuch as compounds of this class exhibit little tendency to char or carbonize even when the flux is kept at high temperatures for considerable lengths of time. In general, I prefer to use about 40 to 60 per cent by weight of this vehicular component.

Suitable addition compounds, such as diethanolamine hydrochloride,

(CH₂OH.CH₂)₂NH.HCl, are preferably formed by reacting equimolar proportions of the amine and the ammonium salt of the hydro-halide, in this case, NH₄Cl. Moderate heating for a short time will cause such reaction to occur. The hydrofluoride addition compound is also made by combining equimolar proportions of amnio compound and ammonium fluoride. Ammonium bifluoride (NH₄F.HF) may also be used, although here the hydro-halide addition compound is made by combining the component substances in the ratio of 1 mol. of amino compound to ½ mol. of the bifluoride. I find that the best results are obtained when all of the amino substance has been reacted with the fluoride and the chloride. In lieu of using these ammonium salts to produce the corresponding hydrohalide addition compound, gaseous HCl and HF may be employed. However, such a manner of preparing these addition compounds is very unsatisfactory and cannot be practiced without elaborate and costly equipment. During this reaction the ammonia content of the ammonium chloride and ammonium fluoride, or a large portion thereof, passes off as a gas, any part of the ammonia remaining having no apparent effect upon the action of the flux. Accordingly, when calculating the weight of the entire flux, any possible ammonia content as the result of the employment of ammonium salts may be disregarded.

In the usual practice of this invention, the flux will be entirely compounded from the polyhydric alcohol and the hydrochloric and hydrofluoric acid addition compounds described above, or the materials employed to produce them in the flux. However, as is well known to those skilled in the art to which this invention pertains, it will sometimes be desirable to incorporate in the flux certain other substances than those mentioned above in order to enhance certain properties of the flux, provided that such other substances can be added without diminishing the action of the flux.

As an example of the manner in which this invention may be practiced, the following illustration is given:

It was desired to prepare a thousand grams of a flux which was to contain 25 per cent diethanolamine hydrochloride, 25 per cent diethylene triamine hydrofluoride, and 50 per cent glycerol. For this purpose 185.6 grams of diethanolamine were reacted with 94.45 grams of $NH_4Cl$, and the resulting addition compound was mixed with the addition compound formed by reacting 209.4 grams of diethylene triamine with 75.2 grams of $NH_4F$. 500 grams of glycerol were then added to the mixture of these addition compounds. This flux was then put into a suitable vessel along with a high tin solder. The vessel was then heated until the solder became molten, the flux forming a supernatant liquid layer. An assembly was formed by holding two quarter-inch wide strips, one of aluminum and one of copper, in a nearly parallel position with the lower ends in contact, and the lower end of this assembly was then dipped into the bath. The portion of the assembly which projected into the solder was slowly worked up and down from solder to flux several times during the interval of about one-half minute. The assembly was then withdrawn from the bath and allowed to cool. The entire portion of the assembly which had been dipped into the solder was found to be covered with a thin, smooth layer of solder and the tubes were firmly bonded by a continuous, regular fillet of solder metal. This bath was employed on various metals including aluminum, copper, brass, bronze, nickel, iron and steel over the period of several days. During this time both the flux and the solder layers gradually became depleted, and both were replenished with materials identical to those which originally went to form the bath. There was no evidence that the flux had in any way interacted with the solder. While the flux portion of the bath was perceptibly thicker and darker at the end of this test period, its efficiency was but slightly impaired and it could have been used for a considerable length of time thereafter.

For purposes of comparison, other fluxes were made up containing only one amino hydro-halide addition compound. One such flux consisted of 25 per cent by weight of diethylene triamine hydrofluoride and 75 per cent glycerol, whereas the other consisted of 25 per cent diethanolamine hydrochloride and 75 per cent glycerol. These fluxes were employed in the fashion described in the preceding paragraph, but poor results were obtained in each case since the resulting flux was not active enough to meet the demands of the dip-soldering operation.

The term "aluminum" as herein employed, is intended to embrace this metal in its commercially pure form as well as in the form of alloys wherein it constitutes at least 50 per cent by weight.

I claim:

1. A flux composition for dip-soldering metallic members, containing at least one hydrochloric addition compound of the group consisting of the amino alcohols and poly-amines, at least one hydrofluoric addition compound of the group consisting of the amino alcohols and poly-amines, and a polyhydric alcohol, said flux being characterized by a substantial absence of interaction with the molten solder at operating temperatures, and by a comparative freedom from vaporization, carbonization, and polymerization at such temperatures.

2. A flux composition for dip-soldering metallic members, containing a total of about 25 to 75 per cent of a hydrochloric addition compound of the group consisting of the amino alcohols and poly-amines and of a hydrofluoric addition compound of the group consisting of the amino alcohols and poly-amines, and about 25 to 75 per cent of a polyhydric alcohol, said flux being characterized by a substantial absence of interaction with the molten solder at operating temperatures, and by a comparative freedom from vaporization, carbonization, and polymerization at such temperatures.

3. A flux composition for dip-soldering aluminum members, containing a total of about 25 to 75 per cent of at least one hydrochloric addition compound of the group consisting of the amino alcohols and poly-amines and of at least one hydrofluoric addition compound of the group consisting of the amino alcohols and poly-amines in the proportion of 5 to 70 per cent of the hydrochloric addition compound and 5 to 70 per cent of the hydrofluoric addition compound, and about 25 to 75 per cent of a polyhydric alcohol, said flux being characterized by a substantial absence of interaction with the molten solder at operating temperatures, and by a comparative freedom from vaporization, carbonization, and polymerization at such temperatures.

4. A flux composition for dip-soldering metallic members, containing about 15 to 35 per cent of at least one hydrochloric addition compound of the group of amino compounds consisting of ethylene diamine, diethylene triamine, triethylene tetramine, tetraethylene pentamine, monethanolamine, diethanolamine, and triethanolamine, about 15 to 35 per cent of at least one hydrofluoric addition compound of the group consisting of said amino compounds, and about 30 to 70 per cent of at least one polyhydric alcohol, said flux being characterized by a substantial absence of interaction with the molten solder at operating temperatures, and by a comparative freedom from vaporization, carbonization, and polymerization at such temperatures.

5. A flux composition for dip-soldering metallic members, containing about 15 to 35 per cent of at least one hydrochloric addition compound of the group of amino compounds consisting of ethylene diamine, diethylene triamine, triethylene tetramine, tetraethylene pentamine, monethanolamine, diethanolamine, and triethanolamine, about 15 to 35 per cent of at least one hydrofluoric addition compound of the group consisting of said amino compounds, and about 30 to 70 per cent glycerol, said flux being characterized by a substantial absence of interaction with the molten solder at operating temperatures, and by a comparative freedom from vaporization, carbonization, and polymerization at such temperatures.

6. A flux composition for dip-soldering metallic members, containing about 15 to 35 per cent of at least one hydrochloric addition compound of the group of amino compounds consisting of ethylene diamine, diethylene triamine, triethylene tetramine, tetraethylene pentamine, monethanolamine, diethanolamine, and triethanolamine, about 15 to 35 per cent of at least one hydrofluoric addition compound of the group consisting of said amino compounds, and about 30 to 70 per cent ethylene glycol, said flux being characterized by a substantial absence of interaction with the molten solder at operating temperatures, and by a comparative freedom from vaporization, carbonization, and polymerization at such temperatures.

7. A flux composition for dip-soldering metallic members, containing about 15 to 35 per cent of at least one hydrochloric addition compound of the group of amino compounds consisting of ethylene diamine, diethylene triamine, triethylene tetramine, tetraethylene pentamine, monethanolamine, diethanolamine, and triethanolamine, about 15 to 35 per cent of at least one hydrofluoric addition compound of the group consisting of said amino compounds, and about 30 to 70 per cent propylene glycol, said flux being characterized by a substantial absence of interaction with the molten solder at operating temperatures, and by a comparative freedom from vaporization, carbonization, and polymerization at such temperatures.

MIKE A. MILLER.